Aug. 10, 1954 J. P. ECKERT, JR., ET AL 2,686,100

PULSE RECORDING APPARATUS

Original Filed May 27, 1948

6 Sheets-Sheet 1

INVENTOR.
JOHN PRESPER ECKERT, JR.
JOHN CLARK SIMS, JR.
HERBERT FRAZER WELSH

BY Busser & Harding
ATTORNEYS.

Aug. 10, 1954

J. P. ECKERT, JR., ET AL 2,686,100

PULSE RECORDING APPARATUS

Original Filed May 27, 1948

6 Sheets-Sheet 2

INVENTOR.
JOHN PRESPER ECKERT, JR.
JOHN CLARK SIMS, JR.
HERBERT FRAZER WELSH

BY Busser & Harding

ATTORNEYS.

Aug. 10, 1954 J. P. ECKERT, JR., ET AL 2,686,100

PULSE RECORDING APPARATUS

Original Filed May 27, 1948

6 Sheets-Sheet 3

INVENTOR.

JOHN PRESPER ECKERT, JR.

JOHN CLARK SIMS, JR.

HERBERT FRAZER WELSH

BY Busser & Harding

ATTORNEYS.

INVENTOR.
JOHN PRESPER ECKERT, JR.
JOHN CLARK SIMS, JR.
HERBERT FRAZER WELSH
BY Busser & Harding
ATTORNEYS.

Aug. 10, 1954

J. P. ECKERT, JR., ET AL 2,686,100

PULSE RECORDING APPARATUS

Original Filed May 27, 1948

6 Sheets-Sheet 5

INVENTOR.
JOHN PRESPER ECKERT, JR.
JOHN CLARK SIMS, JR.
HERBERT FRAZER WELSH

BY Busser & Harding

ATTORNEYS

Aug. 10, 1954 J. P. ECKERT, JR., ET AL 2,686,100

PULSE RECORDING APPARATUS

Original Filed May 27, 1948

6 Sheets-Sheet 6

INVENTOR.
JOHN PRESPER ECKERT, JR.
JOHN CLARK SIMS, JR.
HERBERT FRAZER WELSH
BY Busser & Harding
ATTORNEYS Patented Aug. 10, 1954

2,686,100

UNITED STATES PATENT OFFICE 2,686,100

PULSE RECORDING APPARATUS

John Presper Eckert, Jr., John C. Sims, Jr., and Herbert Frazer Welsh, Philadelphia, Pa., assignors, by mesne assignments, to Remington Rand Inc., New York, N. Y., a corporation of Delaware Original application May 27, 1948, Serial No. 29,434. Divided and this application April 12, 1949, Serial No. 87,056

21 Claims. (Cl. 346—33)

This invention relates to magnetic or similar recording apparatus and has particular reference to the recording of information on magnetic tape in coded form and the reproduction of such information from the tape through a relatively slowly acting mechanism such as an electrical typewriter. While certain aspects of the invention relate to the use of magnetic tape containing a plurality of recording channels, other aspects could equally relate to magnetic wire recording and reading. For simplicity of description tape will be referred to with the understanding that this term includes wire wherever the invention would be applicable thereto, i. e., not necessarily directed to multiple channel operations.

This application is a division of our application Serial Number 29,434, filed May 27, 1948, now Patent No. 2,625,607.

In devices for reading out information recorded magnetically on tapes, as in sound reproducing systems, it is customary to move the tape relatively to a pick-up unit at such a high rate of speed that the electrical output from the pick-up unit is in the form of a sufficiently high frequency electric potential or current, and of sufficient magnitude above background noise, that amplification is readily effected to operate either a sound reproducer or other devices which are adapted to make use of the relatively high frequency output. Heretofore, magnetic tape recording has been useful only when used in systems in which such a high frequency output can be utilized. Magnetic tapes, however, are well adapted for the storage of coded information in the way of minute magnetized spots thereon which, for convenience of terminology, will be hereinafter referred to as pulses; for example, as indicated hereafter a magnetic tape may very well be provided with multiple lengthwise channels carrying pulses selectively arranged so that a particular combination of pulses existing in corresponding positions in the various channels may represent numbers, letters, punctuation, machine instructions or other information. In most instances, however, the information thus carried by a tape cannot be utilized at the rate of delivery of the information through a pick-up head corresponding to such linear speeds of the tape as would give rise to output signals of a magnitude which could be amplified and utilized. As an example, suppose it is desired to use the tape to control an electric typewriter. In such a case the information which may determine the printing by a particular key of the typewriter may be represented by pulses having a length along the tape of no more than, say, ten thousandths of an inch, and for conservation of the tape the particular arrays of pulses representing different characters to be typed would not be spaced more than a few thousandths of an inch along the length of the tape. If the typewriter is to be operated from the output of the pick-up without the interposition of intermediate memory devices, it is obvious that the speed of the tape must be correlated with the typing speed of the typewriter which may mean, for example, that no more than sixteen characters should be delivered by the tape per second. This would represent a very slow movement of the tape as at a rate, at most, of only a fraction of an inch per second with the result that only extremely small signals would be obtained from the pick-up, quite impractical to segregate from background noise at an amplifier output.

It is one object of the present invention to provide means for reading information from a magnetic tape when the tape is essentially stationary or moving very slowly so far as its average speed of advance is concerned. Briefly stated, this result is secured, in a preferred embodiment of the invention, by imparting to the tape in the vicinity of a pick-up a rapid vibration of quite small amplitude so as to get an output signal involving a modulated carrier having the frequency of the vibration, the modulation depending upon the pulses on the tape. In accordance with the invention, however, other modulation methods may be used though, generally speaking, they are inferior in involving the necessity for avoidance of disturbing effects produced by the earth's magnetic field or other stray magnetic fields.

It will be evident that by thus producing a modulated carrier information may be read from the tape as slowly as may be desired from the standpoint of the frequency of succession of the units of information and hence the invention is applicable for the direct drive, without intermediate memory devices, of such mechanisms as typewriters or other printing apparatus or of card or tape punches or the like.

One of the broad objects of the present invention is concerned with the attainment of slow reading out of information in the fashion indicated.

A further object of the invention relates to the provision of means for making use of the modulated carrier of the type described. As will be evident, when the information is carried by a tape on a plurality of channels, the response of an ultimate device, such as a typewriter, must be determined by what is picked up from some points bearing a predetermined relationship with each other in the several channels. If conservation of the tape is to be achieved with very close spacing of the units of information along the length of the tape it will be obvious that extreme and practically unattainable accuracy of mechanical parts would be required to insure that corresponding modulations of the various carrier channels should be so precisely in phase as to exercise their results practically simultaneously. Another object of the present invention is, therefore, to provide a system which will insure the proper utilization of the signals delivered from a group of pick-ups to avoid reading errors while nevertheless permitting the maximum amount of information to be carried per unit length of the tape.

As will be evident from the detailed description hereafter, the attainment of the last mentioned object solves not only the problem of securing proper pick-up of signals from a number of channels of a slowly moving tape but also that of securing from a number of channels of a rapidly moving tape a number of substantially simultaneous signals despite inaccuracy of alignment of signals in the individual channels with their respective heads. Hence this last mentioned object is not limited to the use of a slowly moving tape; furthermore it is not limited to a modulalation system.

A further object of the invention is to provide a pick-up unit which will insure as nearly as possible simultaneous delivery from a tape of signals which should theoretically be delivered simultaneously. This unit is also designed to provide precise location of information on a tape. Furthermore, a circuit arrangement is provided for placing information on the tape which in its preferred form incorporates various circuit elements involved in reading the information from the tape thus leading to simplicity in a system which, in its entirety, permits storing of information on the tape by manipulation of a typewriter and reproduction from the tape on the same or a similar typewriter or on a battery of similar typewriters. Particularly it is an object of the invention to provide recording and pick-up assemblies of such type as to make easy precise duplication of construction so that tape records made on one mechanism may be read on another with assurance of accurate reproduction of the original recorded information. It will be obvious that certain aspects of the invention are applicable to recording on, and reproduction from, films or tapes on which recording is effected photographically or by printing or other process rather than magnetically.

It is a further object of the invention to provide means for recording and reading out information to or from a number of very closely arranged channels on a tape without cross-talk during either recording or reproduction.

Another object of the invention relates to an improved means for securing modulated signals from a tape by causing vibration of the tape locally.

As will be later evident, some of the objects above are not limited to the reading of or recording on magnetic tape: but are applicable to other types of reading and recording involving, for example, photographic film, perforated tape or the like.

These and other objects of the invention particularly relating to details of construction and operation will become apparent from the following description read in conjunction with the accompanying drawings in which.

Figure 1A:
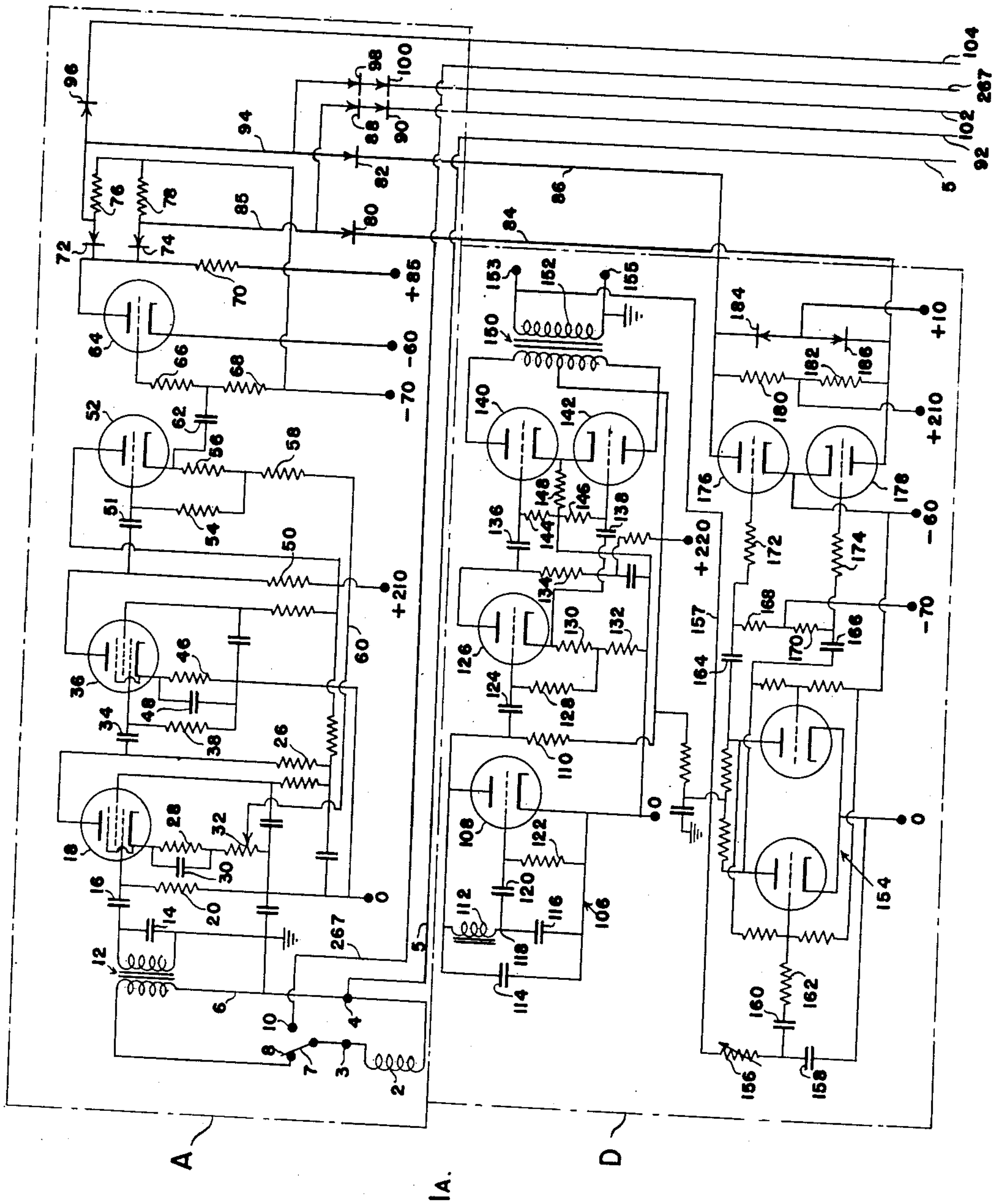
Figures 1A and 1B are complementary wiring diagrams illustrating the wiring of the apparatus but involving, as shown, only the apparatus for a single channel together with those parts which are common to a complete group of channels.
Figure 1B:
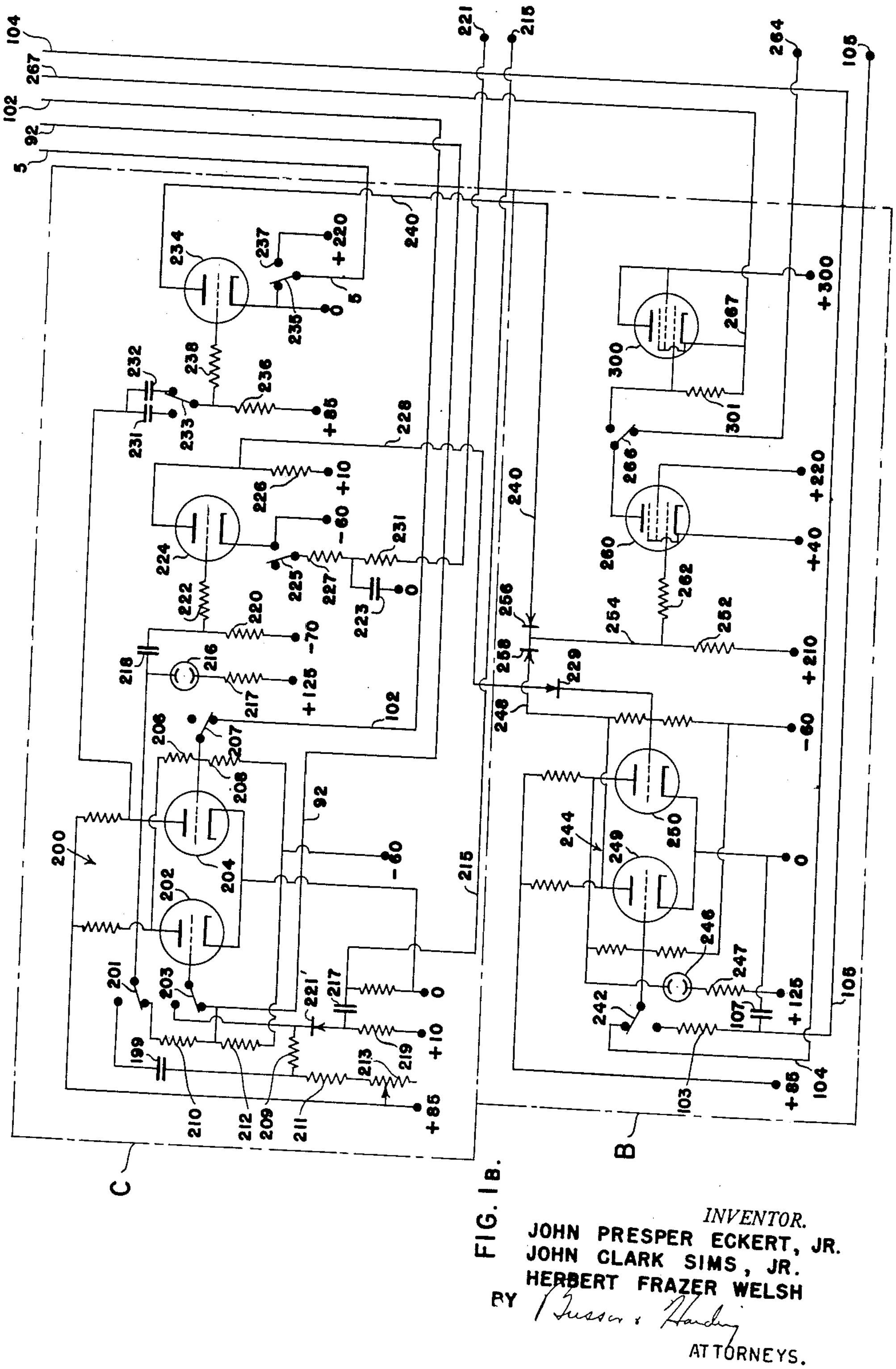
Figure 2:
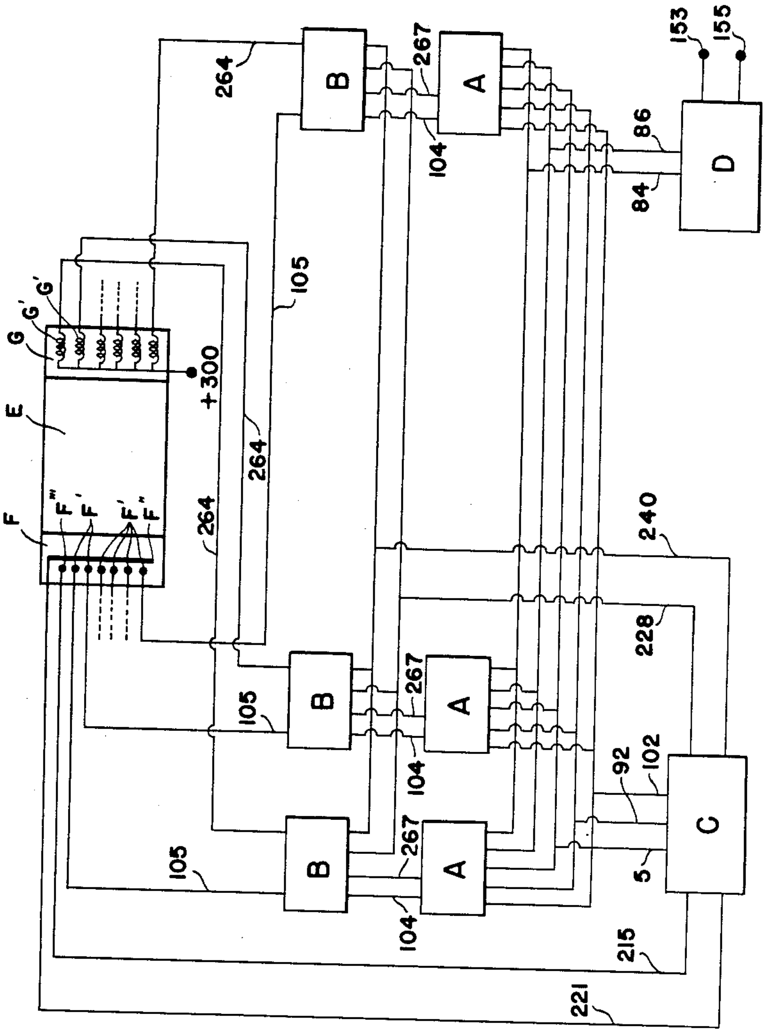
Figure 2 is a block diagram which, considered in conjunction with Figures 1A and 1B, will make clear the fashion in which control is effected in the use of multiple channels.
Figure 5:
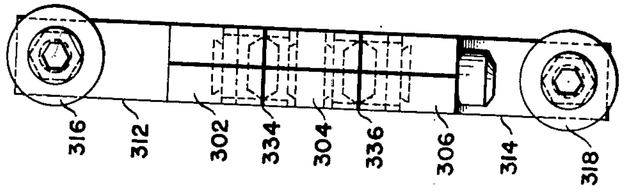
Figure 5 is a side elevation of the same.

There will first be considered Figures 1A and 1B which illustrate the electrical details and interconnections of four types of elements, A, B, C and D which are bounded by the rectangles correspondingly designated. A represents what might be called an amplifier and phase detector element. B is a power amplifier involving a flip-flop which serves the purpose of providing a memory and holds the pulse or no-pulse condition of the read-in signal from a tape during the time that other channels are setting up in preparation for the parallel reading out from all channels. C is a timing and control element. D is a signal generator. Only one unit C and one unit D are included in a complete system. Of the elements A and B, however, there is one of each corresponding to each tape channel which is connected to the key and type mechanism of an electrical typewriter. For consistency of description it will be assumed that there are six such channels though the magnetic tape may contain additional channels utilized to carry control information; in fact, in Figures 3 to 7, inclusive, provision for eight channels is illustrated. Reference will be later made to Figure 2 to show how the elements which occur in multiple are connected into the system; Figures 1A and 1B, however, show in detail only one element A and only one element B which would correspond to the same tape channel.

The coil of the recording and reproducing head of a channel is indicated at 2. As will be pointed out hereafter the same head is used for both purposes and references to recording and reproducing will be used only to distinguish the functions of the head directly under consideration. One of the terminals 4 of the coil 2 is connected to a line 5 which constitutes a common line for the corresponding terminals of all of the head coils. During reproduction this line is connected to zero potential; during recording it is connected to a positive 220 volt source. The other terminal 3 of the coil is connected to a single-pole double-throw switch 7 which may selectively connect it to contacts 8 and 10. In the figures under discussion there are a number of double-throw switches illustrated and for consistency all of these switches are illustrated in the positions which they occupy when reading of the tape is to be effected.

As illustrated, the coil 2 is connected to the primary of the input transformer 12, the secondary of which is tuned by a condenser 14 to the standard frequency of the system, i. e., that frequency at which the tape is oscillated. Signals from the tuned secondary are passed through condenser 16 to the control grid of a pentode amplifier tube 18, there being provided a conventional grid resistor 20 and plate load resistor 26 with conventional screen supply. Connected to the cathode is a fixed bias resistor 28 bypassed by a condenser 30, this resistor being in series with a potentiometer 32 which is part of a feed-back arrangement mentioned hereafter. The output from the plate of tube 18 passes through the condenser 34 to the control grid of a second pentode 36 having the conventional grid resistor 38, a cathode biased resistor 46 bypassed by condenser 48 and conventional screen and plate connections, the plate resistor being shown at 50. The output from this stage is delivered through the condenser 51 to the grid of the triode 52 in a cathode follower circuit. The triode 52 has its grid resistor 54 connected to the junction of the cathode resistors 56 and 58 across which the signal is developed. The cathode current of this tube flows back through the line 60 and a portion of the potentiometer 32 so that there is developed a potential in the cathode circuit of the tube 18 providing inverse feedback to insure uniform gain characteristics of this amplifier system. Without such inverse feedback the amplifier would change its operating characteristics as the tubes and other components of the circuit age.

At this point it may be remarked that, to facilitate understanding of the operation by those skilled in the art, there are indicated at various terminals the direct potentials provided by a conventional power supply, the details of which need not be considered since they are well known; for example, it will be noted that the plate and screen potentials of the amplifying system so far described are provided from a direct positive 210 volt source while the lower end of the potentiometer 32 is connected to a zero voltage point in the system.

The amplified signal from the three stage amplifier which has been described is delivered through the condenser 62 to the grid circuit of the triode 64. The signals developed by the amplifier are sufficiently large to drive the tube 64 from below cut-off well into saturation. The grid circuit of the tube 64 includes two resistors 66 and 68. The resistor 66 is such that when the output signal from the amplifier drives the grid of triode 64 positive the grid current flow through resistor 66 will provide a potential drop so as to prevent the grid from going substantially positive relative to its cathode. The peak of the wave is thus clipped. It will be noted that the resistor 68 is returned to a potential of minus 70 volts, sufficiently lower than its cathode potential of minus 60 volts so that the triode 64 is completely cut off when no signals are delivered to it. The purpose of the triode 64 and its circuit is to transform approximately sinusoidal waves at the input of the amplifier into pulses of approximately rectangular shape in the output from the triode. The use of the large negative bias on the grid of triode 64 inhibits operation of the triode until certain minimum signals have been delivered to it and thus it suppresses noise signals which may come through the amplifier but which are of less than a critical amplitude. The pulse-like signals produced in the triode 64 appear across the resistor 70 which connects the plate of this triode with a positive 85 volt potential. It may be noted that the arrangement described not only produces substantially rectangular pulses but pulses which are also relatively narrow as compared with the half period of a substantially sinusoidal input.

These narrow pulses are fed to a diode gating circuit providing phase detection. To the plate of triode 64 are connected the anodes of diodes 72 and 74, which (as well as other diodes indicated hereafter) may be of the germanium crystal type, in series with respective resistors 76 and 78 which have a common return to the negative 70 volt potential source for the grid of triode 64. (It may be here noted that, throughout the drawings, the arrow heads in diodes indicate their cathodes while the orthogonal lines indicate their anodes.) When no signal or a negative signal is delivered to the triode its grid will be in cut-off condition and its plate, in the absence of the diodes and their connections, would rise to the plus 85 volt potential to which the plate resistor 70 is connected. However, since the diodes are connected through their resistors to the negative potential source they will be conducting and the current flow through the resistor 70 will decrease the maximum potential to which the plate of triode 64 may rise by reason of the drop through resistor 70. Although the return is to a negative 70 volt potential, under these conditions of zero or negative signal to the grid of triode 64 the cathodes of the diodes 72 and 74 will be at a positive potential with respect to the zero reference potential, the resistors 70, 76 and 78 having values to secure this condition consistent with the total current flows therein.

If the circuit so far described up to and including the triode 64 is examined it will be noted that a positive swing of the control grid of the tube 18 will produce a negative pulse at the anode of the tride 64. These negative pulses have their peaks below the zero of potential and if it were not for additional current flow to the cathodes of the diodes 72 and 74 their cathodes would be rendered negative by reason of the connections through the resistors 76 and 78 to the negative potential source. However, as will be pointed out shortly, this does not occur until a coincidence occurs between a negative pulse at the anode of the triode 64 with negative pulses provided from the signal generator which will now be described. To complete the description of the element A, however, it may be noted that the cathodes of the diodes 72 and 74 are respectively connected through crystal diodes 82 and 80 to lines 86 and 84. Furthermore, they are respectively connected through the series arrangement of diodes 98 and 100, and 88 and 90, respectively, to the lines 102 and 92. In addition, the cathode of the diode 72 is connected through the crystal diode 96 to the line 104. It will be noted that in all of these cases the cathodes are connected together. The various lines just mentioned will reappear hereafter.

The signal generator indicated at D consists of an oscillator 106 which may be of any suitable type but which is illustrated as of the Colpitts type. This consists of a triode 108 having a plate resistor 110 connected to a positive potential source. Signals appearing across this plate resistor are fed back to the grid circuit through an inductor 112 in series with a condenser 116, both being shunted by the condenser 114. From the junction point 118 connection is made through the condenser 120 to the grid of the triode 108, there being provided the usual grid resistor 122. This oscillator operates in conventional fashion to provide an output at the frequency at which it is desired to oscillate the tape from which signals are being read.

The output from the plate circuit of the oscillator is fed through blocking condenser 124 to the grid of the triode 126 which acts as a phase inverter. This triode has a suitable grid resistor 128 connected to the junction of the two cathode resistors 130 and 132. These two cathode resistors have a total series resistance approximately equal to the resistance of plate resistor 134 and thus the signal developed across the resistor 134 is approximately equal to that developed across the series arrangement of the resistors 130 and 132. The signals, however, will be 180° out of phase with each other. These signals are fed through blocking condensers 136 and 138 to the control grids of the triodes 140 and 142 which act as power amplifiers. The input resistors 144 and 146 of these tubes are returned to zero potential while the cathodes of the tubes 140 and 142 are returned to zero potential through a common bias resistor 148. The plates of the two tubes 140 and 142 are connected in push-pull to an output transformer 150 in the manner normally used for audio power drive. The secondary 152 of the transformer 150 is matched with and connected to the tape oscillating driver as will be described hereafter, the connection of this being to the terminals 153 and 155 of the transformer secondary. It will be noted that the terminal 155 is grounded.

The terminal 153 is connected through the line 157 to a phase shifter comprising the variable resistor 156 and the condenser 158. The purpose of this phase shifter is to produce a shift in phase to compensate for any phase shift which may occur in the electromechanical device which oscillates the tape to insure coincidence of pulses as later described. Signals are fed from the phase shifter through blocking condenser 160 and resistor 162 to a conventional flip-flop 154 of the Eccles-Jordan type which is well known in the art. Resistor 162 is present to avoid interference by condensers 158 and 160 with the flipping action. High speed operation is not here required and hence the flip-flop can be of the type suitable for low speed operation. The output of the flip-flop delivered through the condensers 164 and 166 will consist of square waves occurring at the frequency of the oscillator 106, but as delivered through the two condensers, 180° out of phase with each other. These condensers are connected to a pair of resistors 168 and 170, the junction point of which connects with a negative 70 volt potential source. The signals through the condensers are transmitted to the grids of a pair of triodes 176 and 178 through resistors 172 and 174. The plates of these triodes are connected to a positive 210 volt source through the resistors 180 and 182. The condensers 164 and 166 in conjunction with the resistors 168 and 170 perform differentiation upon the square wave signals, i. e., their time constant is very short. Pulses will, therefore, be delivered to the grids of the triodes 176 and 178 at the times the flip-flop 154 undergoes transition. Both tubes 176 and 178 are biased to cut-off and accordingly only positive pulses applied to their grids will be effective. Thus at the time of zero phase positive peaks, a positive pulse will be delivered to the grid of the tube 178 through the condenser 166. At the time of the peaks which are 180° out of phase a positive pulse will be delivered to the grid of the tube 176. These positive pulses applied to the grids produce negative pulses at the plates due to currents through the plate resistors 180 and 182. The potential to which the plates of the tubes 176 and 178 may rise at the times when their grids are cut-off is limited by the presence of the crystal diodes 184 and 186 which have a return to a positive 10 volt potential source. Negative pulses originating from a positive 10 volt origin are, therefore, delivered to the lines 84 and 86.

It is now possible to describe the gating action conjointly effected by the elements A and D which have so far been described. When no pulses are provided at the anodes of the crystal diodes 72 and 82 through their respective connections to the plate of triode 64 and to the line 86 these anodes will be positive and, consequently, current will flow through the resistor 76 to the negative 70 volt source and their cathodes will be at a positive potential. When a negative pulse emanating from the plate of triode 64 is imposed on the anode of the diode 72 in the absence of a simultaneous pulse through the line 86 the cathode of the diode 72 will be more positive than its anode and, consequently, the diode is, in effect, open-circuited and its cathode takes the approximately 10 volt positive potential of the line 86. The same action occurs if a negative pulse through the line 86 is not coincident with a pulse from the triode 64, i. e., the junction of the cathodes of the diodes 72 and 82 remains positive. A positive condition at this junction involves a positive condition of the cathodes of the crystal diodes 96 and 98 with respect to their anodes and accordingly no outputs will occur through the lines 104 or 102.

However, coincidence of negative pulses delivered to the diodes 72 and 82 will remove both sources of positive potentials from their anodes and their cathodes will become negative through connection to the negative 70 volt potential source. Thus negative pulses will be transmitted through the diodes 96 and 100 and 98 to the lines 104 and 102. As will be hereafter described, these lines run to the grids of triodes having their cathodes at zero potential.

The above explanation identically applies to the diodes 74 and 80 so that coincidence of negative pulses from the plate of triode 64 and the line 84 will produce negative pulses through the crystal diodes 88 and 90 to the line 92, also connected to the grid of a triode having its cathode at zero potential.

In accordance with the phasing assumptions which have been made previously a positive signal applied to the grid of tube 18 occurring in zero phase, i. e., with the positive peaks at the terminal 153 will result in the production of a negative pulse through the line 92. On the other hand, if these two signals are 180° out of phase there will occur at the time of a positive pulse at the grid of tube 18 negative pulses in the lines 102 and 104. Summarizing, an in phase condition of the grid of tube 18 and terminal 153 will produce negative pulses in line 92; an out of phase condition of the grid of tube 18 and terminal 153 will produce negative pulses in lines 102 and 104. Thus a phase selective system is provided.

Referring now to the circuit element C in Figure 1B, there is illustrated at 200 a flip-flop of Eccles-Jordan type comprising the triodes 202 and 204. During the reading of signals from the tape, switches 201 and 203 and 207 are in the positions illustrated. Switch 201 engages a contact to join the plate of triode 204 to the grid of triode 202 through resistance 210 and switch 203. This grid is also joined to the line 92. The grid of triode 204 is connected through resistance 206 to the plate of triode 202 and also through the switch 207 to the line 102. Resistors 212 and 208 connect the grids to a negative potential. It will be noted that the cathodes of triodes 202 and 204 are returned to a zero potential. The plate of triode 204 is connected through a neon bulb 216 and a series resistor 217 to a positive 125 volt potential. It is also connected through condenser 218 and resistor 220 to a negative 70 volt potential. The junction of the condenser 218 and resistor 220 is connected through resistor 222 to the grid of triode 224. The cathode of the triode 224 is connected to a negative 60 volt potential source. Its plate is connected to a positive 10 volt potential source through a resistor 226. Its plate is also connected to the line 228 which runs to the circuit element B hereafter described.

The anode of triode 204 is connected through the condenser 232, switch 233 and resistor 238 to the grid of triode 234, the plate of which is connected to the line 240, extending to the circuit element B, and the cathode of which is at zero potential, a switch 235 in the position illustrated also connecting the line 5 to zero potential.

When a pulse is first encountered on the magnetic tape by a head H its leading edge produces a signal which at the grid of the tube 18 is 180° out of phase with the output at the terminal 153. Accordingly, negative pulses will be transmitted through the line 102 to the grid of the triode 204 cutting off this triode and extinguishing the neon bulb 216 by raising the plate potential of this triode to the positive 85 volt potential of its source so that the resulting potential drop of 40 volts across the neon bulb is insufficient to maintain current flow through it. At the same time the triode 202 is rendered conducting. At the time of this transition a positive pulse is emitted through the condenser 218. It may be here noted that the first negative pulse delivered through the line 102 will throw the flip-flop 200 into the state just described and subsequent negative pulses through the line 102 will be without any action on the flip-flop. As will be evident hereafter, such an initial flipping pulse may originate in any one of a group of heads.

The condenser 218 in conjunction with the resistor 220 provides a differentiating action so as to deliver a sharp positive pulse through the resistor 222 to the control grid of the triode 224 at the time the positive pulse is delivered through the condenser 218 due to the transition of the flip-flop just described. The arrival of this sharp positive pulse at the grid of the tube 224 causes a negative pulse to be developed at its plate which pulse will be emitted along the line 228, noting that the cathode of triode 224 is at a negative 60 volt potential while its anode is connected to a positive 10 volt potential. The circuit of the triode 224 is only sensitive to positive pulses delivered to it through the resistor 222, since it is normally cut-off by the negative potential of its grid with respect to its cathode.

As the magnetic tape advances beneath the heads the trailing edge of a pulse will ultimately produce signals which at the grid of tube 18 will be in phase with the output at the terminal 153. As indicated previously, a negative pulse will thus be produced through the line 92 which will render the triode 202 of the flip-flop 200 non-conducting and the triode 204 conducting. The neon tube 216 will now be fired and a negative pulse will be transmitted through the condenser 218. This negative pulse, without effect on the circuit of triode 224, will be transmitted to the grid of the triode 234 through condenser 232 and resistor 238, as a sharp pulse due to differentiating action, to cause it to become momentarily non-conducting, interrupting the flow of current to it through the resistor 252, the crystal diode 256 and the line 240.

The circuit element B comprises a flip-flop 244, which constitutes a set-up device or register, including the triodes 248 and 250 in conventional connections. The line 104 is, during reading of the tape, connected through the switch 242 to the grid of triode 248. A neon lamp 246 in series with a resistor 247 is illuminated when the tube 250 is conducting.

A negative pulse through the line 104 renders the triode 248 non-conducting and the triode 250 conducting. The line 248 is thus rendered more positive. Less current is accordingly drawn through the resistor 252 and the crystal diode 258 so that the junction of the anodes of the diodes 256 and 258 is no longer prevented from going positive with respect to the cathode of a pentode 260 which is connected to a positive 40 volt source. The control grid of this pentode is connected to the junction just mentioned through a line 254 and resistor 262. At the time the flip-flop 244 shifts as just described the grid of the pentode 260 will remain at practically the same potential as it was previously, due to the current drawn through the diode 256 and line 240. However, when a negative pulse is applied to the grid of the triode 234 and this triode becomes non-conducting the potential at the grid of the pentode 260 becomes positive with respect to its cathode and accordingly the pentode 260 becomes conducting, drawing a large current from the terminal 264 through the switch 266 which is in the position illustrated. As will be described hereafter, this terminal is connected through a solenoid of a corresponding clutch mechanism in the decoding machine of an electric typewriter to a positive 300 volt potential.

The foregoing description has mentioned only single circuit elements A and B. Actually when a multiple channel tape is used there is one of each of these elements present for each channel while there is only one of each of elements C and D in the entire device. In order now to make clear the complete assembly, reference may be made to Figure 2 which shows the interconnections for a multiple channel device. In Figure 2 there is indicated at E an electrical typewriter capable of encoding to produce magnetic pulses in six channels of a magnetic tape and of decoding signals received from the six channels of a magnetic tape and typing letters, numerals and characters in accordance with the grouping of corresponding pulses in the several channels. The encoding portion of the electric typewriter is indicated at F while the decoding portion is indicated at G.

The typewriter is to a major extent (except for Figure 9) merely diagrammed herein since its internal devices are well known and are illustrated, for example, in the patents to Fitch et al. 2,161,564, dated June 6, 1939 and 2,165,247, dated July 11, 1939. The former patent illustrates the encoding device of the typewriter and from this it will be evident that depression of a particular typewriter key will effect the transmission of pulses on six output channel lines, which pulses, as hereafter described, will provide the magnetic pulses in the various channels of the tape. The latter patent illustrates the mechanism by means of which pulses originating in six channels of a tape will, by the actuation of clutches and associated devices control the operation of the typewriter to print letters, numerals or characters which correspond to the pulse group on the tape. In the portion G of the diagram there are illustrated a group of solenoids which are connected to a common positive 300 volt potential source and to lines 264 heretofore described. These solenoids are the clutch controlling solenoids illustrated in Patent 2,165,247.

In Figure 2 there are illustrated the first, second and sixth pairs of circuit elements A and B with the third, fourth and fifth omitted to simplify the diagram. It will, of course, be understood that these are present and are connected into the complete circuit in the same fashion as those illustrated. In Figure 2 there will be recognized the various lines interconnecting, and external to, the circuit elements described in detail. As will be noted, the lines 5, 92 and 102 from the circuit element C connect to all of the corresponding lines of the circuit elements A. The same is true of the lines 84 and 86 from the circuit element D. Lines 228 and 240 from the circuit element connect with the corresponding lines of the circuit elements B. The corresponding circuit elements A and B of the same channel are connected by the lines 104 and 267. To the coils in the decoding portion G in the typewriter there extend the lines 264 from the elements B. From the encoding portion F of the typewriter there extend the separate channel lines 105 to the elements B and also the lines 215 and 221 to the element C. (The last three lines have not yet been discussed.)

Before proceeding with the description of the overall tape reading operation and the operation of the typewriter thereby there will be described the mechanical and electromechanical elements involved in reading signals out of the tape and in imposing the magnetic pulses thereon. Referring first to Figures 3 to 7, inclusive, there is illustrated therein the assembly of heads for the various tape channels. Blocks 302, 304 and 306, of non-magnetic material such as beryllium-copper, or hard bronze or brass which will resist abrasion when in contact with the magnetizable tape, are accurately machined and ground and assembled with shims 334 and 336 of non-magnetic material between them through the use of bolts 308 and 310 and aligning pins 330 and 332. The adjacent faces of these blocks are ground flat so as to insure close dimensional tolerances. Extensions 312 and 314 have bolted to their accurately ground side faces guiding discs 316 and 318 for the tape. Milled slots 320 and 322 are provided in the adjacent faces of the blocks 302 and 304, and 304 and 306, respectively. There are also milled out hollows 324 and 326 for the reception of the coils of the heads, the leads from which pass out through openings 325 and 327. Within each of the slots 320 and 322 there are located the stacks of accurately dimensioned laminations 338 and 340 which form the magnetic cores of the heads. The laminations 340 carry the windings 342, see Figure 7 (which correspond to the coils 2 of the wiring diagram), and interruptions in the continuity of the laminated cores are provided by the shims 334 and 336. These shims may be 0.0001 to 0.001 inch in thickness and define the gaps in the individual heads which are required for both producing magnetization of the tape and for reading out the signals therefrom. To secure great accuracy, the grinding of the adjacent faces of the blocks may be accomplished with the laminated cores in place.

Between the various slots 320 and 322 there are sawed slots 328 into which there are driven, after assembly, thin sheets of soft iron which prevent cross-talk between adjacent heads. Through the presence of these soft iron shims cross-talk between the heads is reduced to less than 1%, though, without them, cross-talk to the extent of 30% would be expected in an arrangement involving eight channels on a tape of 8 millimeter width.

The entire assembly should be made with the greatest attention to dimensional accuracy since on it depends the accuracy of location of the magnetized spots on the tape and the proper reading of signals from these spots. The edge guides 316 and 318 should have only minute clearances with the edges of the tape so that it cannot move either laterally or in skew fashion with resultant uncertainty of its position relative to the heads. The relationships between the gaps in the heads and these guides must also be very accurately insured.

Figures 3, 4:
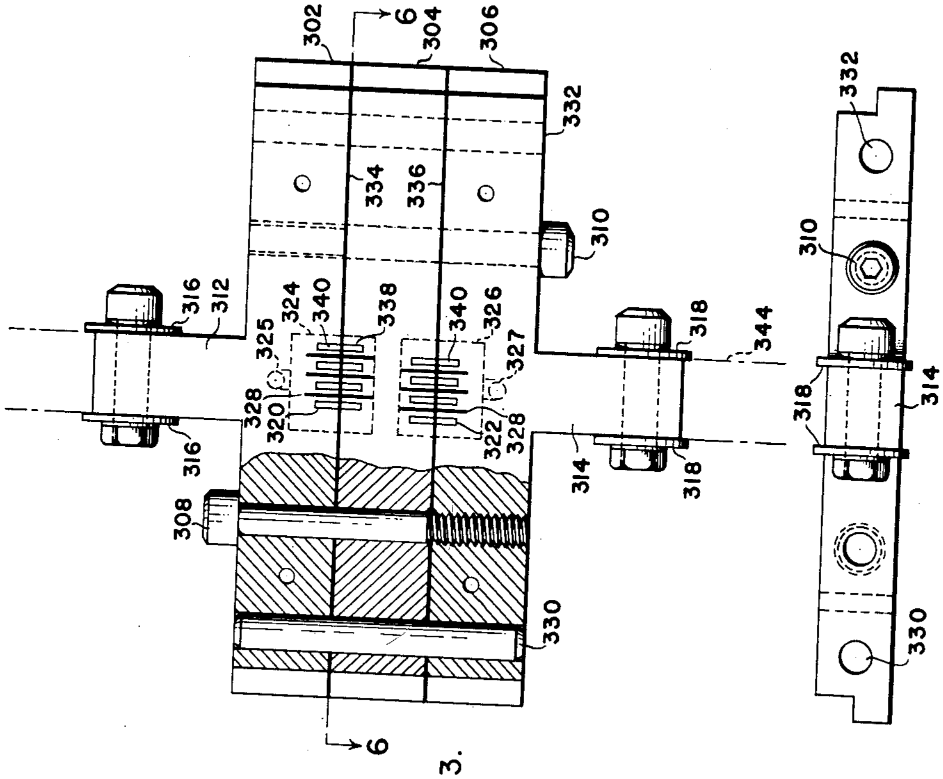
Figure 3 is an inverted plan view, partially in section, of a magnetic head unit used for both recording and reproduction.
Figure 4 is an end elevation of the same.
Figure 6:
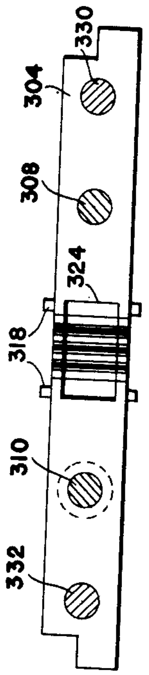
Figure 6 is a transverse section taken on the plane indicated at 6—6 in Figure 3.

As will be noted from Figure 3 the heads are divided into two groups of four heads each in order to provide the necessary spacing for the reception of the coils consistent with the recording of the eight channels on a very narrow tape. The spacings between the respective gaps located by the shims 334 and 336 of the two sets of heads must also be very accurately insured since, as will be obvious, the pulses which are simultaneously read are not distributed in a single line across the tape but rather along two lines having different spacing. When reference is made herein to aligned pulses or spots on the tape there will be understood that there is signified the group of pulses which are simultaneously produced or read in the operation of the device and which are aligned with the gaps of their respective channel heads even though they are not arranged in a single line across the tape. With wider tapes or less channels, of course, all of the heads might have their gaps arranged side by side in a single transverse line.

Figure 8:
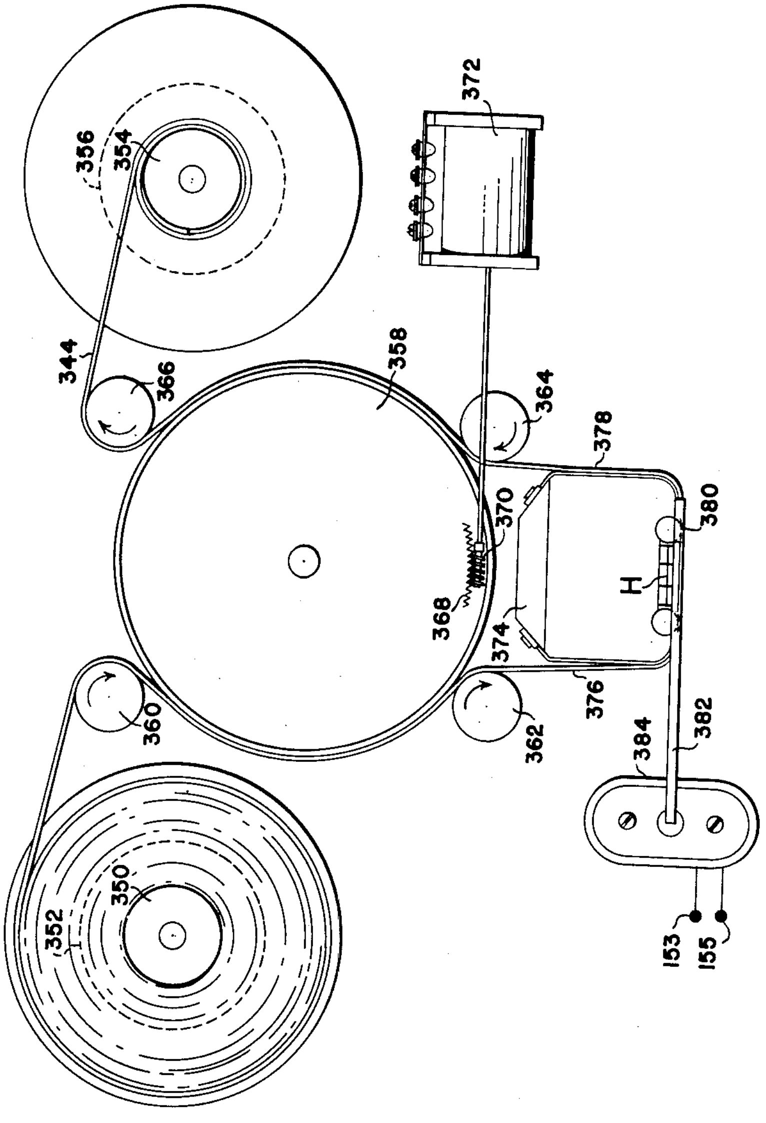
Figure 8 is an elevation, partly diagrammatic in character, illustrating a magnetic tape feeding device, together with the means for vibrating a portion of the tape in the direction of its length.

Referring now to Figure 8, the head assembly which has just been described is indicated at H. The tape passes beneath this assembly which is rigidly held against vibration. A tape supply reel 350 has its mounting shaft connected to a motor indicated at 352 which is continuously energized in a direction to take up the tape. A take-up reel 354 is similarly connected to a motor indicated at 356 which is also energized to take up the tape. The tape 344 extending from these reels passes over idler pulleys 360 and 366 about a drive wheel 358 faced with friction material, thence about idler pulleys 362 and 364, and about the curved lower ends of springs 376 and 378 supported at their upper ends on a fixed member 374. The lower ends of these spring members 376 and 378 are connected to a tape guide 380 which, in turn, is connected through a link 382 with the vibratory element of a driver 384 which has a coil energized through the connections 153 and 155 previously described. This driving device 384 may be in the form of a conventional loud speaker drive adapted to vibrate the members 376, 378 and 380 at a suitable signal frequency such as 200 to 500 cycles per second in the direction of the length of the portion of the tape passing beneath the head H.

A worm 370 driven by a motor 372 drives a wheel 368 connected to the wheel 358 to impart continuous motion to the tape or, if desired, interrupted motion depending upon the nature of the control of the motor 372. For present purposes, it may be assumed that the motor 372 runs continuously to feed the tape at a suitable linear speed across the head assembly. The motors 352 and 356 merely insure that the tape is properly taken up on the reels and exert only sufficient torque for that purpose.

From the construction described it will be evident that the small loop of tape below the idlers 362 and 364 is alone subject to vibration through the action of the driver 384 and that this vibration is in the direction lengthwise of the tape where it passes the pick-up heads. This vibration of the tape creates the signal which appears as an alternating current applied to the grid of the input pentode 18.

Since the arrangement does not involve any motion of the pick-up heads the device is substantially free of disturbances due to the magnetic field of the earth or other stray magnetic fields as contrasted with such devices as would involve vibration of the head or modulation of its magnetic circuit which would require a degree of shielding very difficult to obtain in order to suppress to a satisfactory degree noise signals due to ambient magnetic fields. As also pointed out, the input circuit is of a type which removes the influence of any signals below a certain level. As a result, reading out of the tape pulses can be effected in a thoroughly reliable fashion.

There may now be described the overall operation of the system in the matter of operation of the typewriter from the pulse groups in the channels of the tape.

As will be evident from the construction of the head assembly and from the fashion in which pulses are recorded on the tape the pulses which form a particular code group will be presented to the heads approximately simultaneously and, at any rate, in such fashion that the arrival of a peak of any pulse of a group will not precede the arrival of the leading slope of any other pulse of the group. By accurate construction of the head assembly as described this condition may be easily assured and, accordingly, it will be assumed as a condition preexisting for the operation of reading the tape now to be described.

Assuming phasing consistent with the preceding description (though, of course, an arbitrary 180° phase shift could be used by slight modification of the circuits) the arrival of the leading portion of the first pulse to reach its corresponding channel head will give rise to an input signal at the tube 18 which will be 180° out of phase with the potential of the terminal 153. In accordance with the preceding description this will cause the emission of negative pulses along the lines 102 and 104. Preceding this, in the flip-flop 200 the triode 202 will have been non-conducting and the triode 204 will have been conducting. The negative pulse which is now emitted through the line 102 will cause the triode 204 to become non-conducting and the triode 202 conducting. A positive pulse is thus provided to the grid of triode 224 and a negative pulse is applied from this tube along the line 228 to each flip-flop 244 in the circuit elements B corresponding to the various channels. It may be noted that this pulse is delivered through a diode 229. The purpose of this diode is to allow the flip-flop, upon being pulsed through the crystal, to become "free": i. e. the diode permits the pulse to be delivered to the grid of triode 250 to initiate the flipping action; but once this has started the potential on this grid will not be restrained to assume the potential of the line 228 and it may become more negative than the potential of line 228. This results in faster flipping and more positive action. In each of these elements the triode 250 is thus rendered non-conducting and the triode 249 is rendered conducting. It is to be noted that since the line 102 is connected to all of the elements A the arrival of a pulse as just described in any of the channels will effect only one operation of the flip-flop 200 which, in turn, will effect "clearing" of all of the flip-flops 244 to put them in the condition stated, irrespective of their previous conditions. In the case of those flip-flops 244 having non-conducting triodes 250 there will, of course, be no change effected. The conditions existing from a previous pulse group are thus cleared out of the device.

While only the first pulse emitted through the line 102 effects any action by throwing the flip-flop 200 as stated, as the tape advances the leading portions of each of the tape pulses of the group, including the tape pulse which gave the first output through the line 102, will cause the emission of at least a plurality of negative pulses through the lines 104. Following the clearing the presence of a pulse in any channel will, accordingly, through this line 104, render in the corresponding flip-flop 244 the triode 249 non-conducting and the triode 250 conducting. The result is that the circuit element B corresponding to any channel involving a tape pulse will be set up so that the crystal gating arrangement, through the line 246, will be prepared for the reception of a pulse along the line 240 to effect current flow through the tube 260.

Nothing will now occur until the peak of one of the tape pulses passes by the gap in its corresponding head which, as previously assumed, will occur only after all of the elements B will be set up corresponding to pulses of the group. Following this event there will be produced an in-phase signal at the grid of the tube 18. As previously described this will give rise to a negative output pulse along the line 92 to the grid of the triode 202 causing this tube to become non-conducting and tube 204 to become conducting. A negative pulse is emitted through the condenser 232 producing a cut-off of tube 234 which, through the lines 240, will result in operation of the gating elements at the input to the tubes 260 in elements B. Accordingly, the tubes 260 which correspond to those channels containing tape pulses will provide current flow through the corresponding clutch controlling solenoids G′ of the decoding portion G of the electric typewriter. As described in Patent 2,165,247 there is thus produced operation of the typewriter key bars to result in the typing of a letter, numeral or other character corresponding to the code group which has been read. It will be noted that the operation of all of the solenoids is effected simultaneously and in accordance with the single signal which is produced by the most advanced peak of the tape pulses in a particular group. It will be evident that subsequent negative pulses delivered through the line 92 will have no effect on the flip-flop 200 and the entire system is accordingly restored to the condition assumed existing at the beginning of this description of the tape reading operation.

It may be here noted that condenser 232 differentiates signals fed to it. This provides a time constant sufficiently short so that the brief pulse applied to the tube 234, while long enough to produce reliable actuation of the clutches by the typewriter receiving solenoids, will nevertheless be short enough to avoid double actuation which would involve printing a character twice. The proper time is provided by the combination of condenser 232 and resistor 236. The condenser 231, used in recording, has a much larger capacitance than condenser 232 since differentiation is not desired during recording, the timing being obtained from flip-flop 200 when connected as a delay flop.

At this point there may be indicated some typical data which has been found to give excellent results. A satisfactory frequency for the longitudinal vibration or oscillation of the tape has been found to be from 400 to 500 cycles per second. This frequency is sufficiently high so as not to impede or interfere with the operation of the typewriter and to give rise to signals of sufficient amplitude to be readily amplified and utilized in the system. On the other, the frequency in this range is not too high to give rise to resonant or other difficulties in the mechanical vibrating system.

A satisfactory amplitude of vibration of the tape lies in the range of 0.001 to 0.002 inch.

The gaps in the heads may desirably be in the range from 0.0005 to 0.0015 inch. The spacing between pulses along a channel may be about 0.01 inch. The length of a pulse may be of the order of 0.005 inch or less. A linear movement of the tape to correspond to reading of eight pulse groups per second, i. e., a movement of about 0.08 inch per second, has been found very satisfactory with a typewriter capable of operation at moderate speeds.

It is to be understood that the figures just given are those which have been used in a particular instance and are not to be regarded as critical or as restrictive of the invention. With higher speed typewriters, for example, it would be possible to read from the tape a substantially larger number of groups per second and with increased precision of construction of head assemblies and decrease of the head gaps the pulses on the tape may have reduced linear dimensions and may be more closely arranged. Even the conservative figures given, however, will show that a very large number of characters may be represented on a single foot length of tape.

A mathematical analysis of the reading of pulses from an oscillating tape in accordance with the described procedure shows that there are delivered from the head frequency modulated signals and leads to the following conclusions:

The signal output from the tape due to its oscillation increases substantially linearly with oscillation frequency.

The signal output from the tape increases with the amplitude of oscillation but not linearly and reaches a maximum when the amplitude is close to a quarter cycle length of the pulse distribution along the tape.

If only frequencies close to the frequency of oscillation are ultimately passed then the wave shape of the original wave (if non-sinusoidal) is increasingly distorted with increasing amplitude of oscillation.

As will be evident from the foregoing, the circuits which have been described are applicable to a system in which modulation is effected otherwise than by the oscillation of the tape, for example, by producing variations in the reluctance of magnetic circuits or the like.

It may also be noted that the system for securing the simultaneous delivery of pulse outputs from a plurality of channels despite possible slight misalignment of the pulses of a group is applicable to the use of a fast moving tape which, without being oscillated, will produce signals of sufficient magnitude to produce output pulses which are not submerged in a noise background. The delivery of a number of simultaneous output pulses may be triggered by the passage of the first peak of a group in essentially the fashion described.

It will also be evident that this matter of securing a simultaneous output from various channels despite small misalignments of pulses in the channels is applicable not only to magnetic tapes but also to other multiple channel recording as well, for example, such as may be provided photographically on film or by punched holes in tapes.

The arrangement by which reading is effected simultaneously from all of a plurality of channels triggered by the attainment of a predetermined condition in any one of them eliminates the necessity for having a "sprocket" arrangement for triggering the reading operation. Heretofore, for example, if pulses were to be read in groups from six channels, it was necessary to provide either actually or in effect a seventh channel to determine when reading from the six channels should be accomplished. In accordance with the present invention, the sprocketing channel is eliminated altogether. This is accomplished, when $n$ channels are to be read, at no more expense than that of reducing the normally $2^n$ possible pulse groups to $2^n-1$ pulse groups. In other words, the only restriction involved is that there cannot be read that pulse group represented by no pulse in any of the channels. The necessity for this may, of course, be very easily avoided. There is, accordingly, read every group which involves at least one pulse in any channel.

There may now be described the recording of pulses on the tape through the operation of the encoding device F of the typewriter. As will be evident, this result could be accomplished through the use of a circuit entirely independent of the circuit through which reading of the tape is effected, merely switching the heads from one circuit to the other as might be required. However, conservation of parts in a complete recording and reading system makes it desirable to utilize as many elements as possible for the two purposes and, consequently, in the preferred system which is herein disclosed this is done, the transition from reading the tape to recording on the tape being accomplished by shifting all of the double-pole switches which are illustrated to their alternative positions. From this point in the description, therefore, it should be understood that such a shift has been effected in the case of each switch.

With the exception of the head coils and the leads 5 and 267 therefrom the circuit elements A and D are not used in the recording operation. There is now no necessity for oscillation of the tape and consequently the circuit element D may, if desired, be taken out of operation through any suitable switching means; however, no harm would be done by oscillating the tape during recording except for a slight lengthening of the recorded pulses. It will be assumed, however, that the tape is advanced at uniform speed past the heads without having oscillations imparted to it.

Assuming the double-throw switches to be in their positions alternative to those illustrated in Figures 1A and 1B and that none of the typewriter keys is depressed the condition of the system will be as follows:

Tube 260 will be cut off due to the low resistance path through the crystal 256, line 240 and triode 234 to zero potential which causes the grid of tube 260 to be negative with respect to its cathode. Under these conditions the grid of each tube 300 is at cathode potential so that the tube is highly conductive with the result that current flows from the positive 300 volt supply terminal through the tube 300, line 267, switch 7, terminal 3, corresponding coil 2, terminal 4, common line 5 and switch 235 which now engages contact 237 connected to the positive 220 volt supply terminal. This condition exists in the elements A and B of each channel and accordingly each head has a current continuously flowing through it from its terminal 3 to its terminal 4. Each head is accordingly energized to produce an erasing action on the tape to remove any pulses previously contained thereon and which, as will be pointed out below, are imposed on the tape in a condition of opposite magnetic polarity obtained by current flow in the opposite direction through the head coils.

The shifting of the switches 201, 203 and 207 will have transformed the flip-flop 200 into a flip-flop of delay type, i. e., the triode 202 of the flip-flop will be normally conducting and the triode 204 normally non-conducting. A negative pulse applied to the grid of the triode 202 will reverse this situation, but only for a limited time after which the flip-flop will return to its original condition. The positive 85 volt terminal from which the anodes of the tubes 202 and 204 are supplied is connected through the adjustable resistor 213, resistor 211 and resistor 209 to the anode of the crystal diode 221 which has a return through resistor 219 to a positive 10 volt terminal. The anode of the crystal diode is connected to the grid of triode 202 through the switch 203. As will be evident, this means that normally the grid of triode 202 is held positive. The anode of triode 204 is connected through switch 201 and condenser 199 to the junction of resistors 209 and 211. Switch 207 disconnects the grid of triode 204 from line 102 but the grid remains connected to the anode of triode 202 through resistor 206 and also through resistor 208 to minus 60 volts.

As will be pointed out hereafter, negative pulses to throw the flip-flop 200 will be delivered through the line 215 and will be differentiated by the condenser 217 and resistor 219 to produce sharp pulses through the crystal diode 221 to the grid of triode 202. When the flip-flop is thus thrown to its abnormal condition it will not return to its normal state until the lapse of a time period determined by the condenser 199 and the resistors 211 and 213. By adjustment of the latter this time period may be adjusted to fix the time of application of current for a pulse group thereby determining the lengths of the pulses recorded on the tape.

When the switches are shifted the attainment of the normal condition of the flip-flop 200, i. e., with the tube 204 non-conducting, will have resulted in the application of a positive pulse to the grid of triode 224 which, in the fashion previously described in connection with reading of pulses from the tape, will result in delivery of a negative pulse to the grid of triode 250 of flip-flop 244. This flip-flop accordingly will be in a condition in which the triode 249 is conducting and the triode 250 is not conducting. The result is a less positive condition of the line 246 and cathode of crystal diode 258. The tube 260 will accordingly be normally non-conducting as stated previously.

The conditions just described exist when no typewriter key is depressed, and action of erasing pulses from the moving tape occurs.

Reference to Patent 2,161,564 will make clear how depression of a typewriter key will close a selected group of switches to produce current flow through selected ones of six channel lines substantially simultaneously. In Figure 2 these switches are indicated at F′ connected to the lines 105.

By the key action the lines 105 are thus connected to a bus F″ which is connected to the line 221. What occurs may be traced as follows: Starting from the negative 60 volt potential terminal which is permanently connected to the cathode of triode 224 the circuit may be traced through switch 225, the filter, comprising resistors 227 and 231 and condenser 223, line 221 and bus bar F″. Thence the circuit is completed through the switch contacts F′ which have been closed by the key operation and lines 105 to the various circuit elements B. In each of these the line 105 connects through resistor 103 and switch 242 to the grid of triode 249. A negative pulse from the negative 60 volt terminal is thus applied to shift the flip-flops 244 corresponding to the channels through which the negative pulses were delivered so that the flip-flops 244 are set up with a resulting more positive condition of the connection 248 of each to the cathode of the crystal diode 258 due to interruption of current flow through triode 249.

As illustrated in Figure 2 there is a seventh contact F‴ connected to the line 215 which in the operation of the typewriter is connected to the bus F″. The contact just mentioned is not illustrated in Patent 2,161,564 but will be described later with reference to Figure 9. The arrangement is such that movements beyond the closures of the individual line switches connect the line 215 to the bus, i. e., all of the selected contacts at F′ are completed before the contact at F‴. As will be immediately described, the contact at F‴ initiates the pulse effecting recording and by the production of a single pulse insures that the recording starts at precisely the same instant in all of the channels. The action is more precise than dependence upon simultaneity of closure of the various channel switches. Actually these do close very nearly simultaneously and where extreme precision is unnecessary to secure a maximum number of pulse groups per unit length of tape it will be obvious that the use of a single pulse to initiate recording may be dispensed with, the recording beginning in such case at the time each individual channel switch is closed.

The connection of the line 215 to the bus results in application of a negative pulse to the differentiating circuit provided by the condenser 217 and resistor 219 so that a sharp negative pulse is applied through crystal diode 221′ to the grid of the triode 202 of flip-flop 200. The resulting transition of the flip-flop produces a negative pulse through the condenser 231 to the grid of the triode 234. The resulting cutting off of this triode interrupts current flow through crystal diodes 256 with the result that the grid of each tube 260 corresponding to a channel in which recording is to be effected becomes positive and the tube becomes highly conducting. A circuit through each individual head which is to apply pulses to the tape may now be traced as follows: from the positive 220 volt terminal through contact 237, switch 235, line 5, coil terminal 4, coil 2, terminal 3, switch 7, line 267, resistor 301 and tube 260 to the plus 40 volt supply terminal. The heavy current thus flowing passing through the resistor 301 drives the grid of the tube 300 highly negative with respect to its cathode so that this tube is cut-off removing in effect the positive 300 volt terminal connected to its anode from the circuit. The current flow just mentioned, it will be noted, is in the direction from the terminal 4 to the terminal 3 of each coil, opposite that previously flowing so that now recording will take place. The interval of recording, however, is terminated by the reverse flipping of the flip-flop 200 after the pre-set interval. When this occurs negative pulses delivered to the flip-flops 244 as above described will clear them to their normal conditions and result in interruption of the recording current flow, reestablishing the erasing current flow by cutting off tube 260 and again rendering tube 300 conducting. The entire system is thus restored to its initial condition ready for the next operation of a typewriter key.

Figure 9:
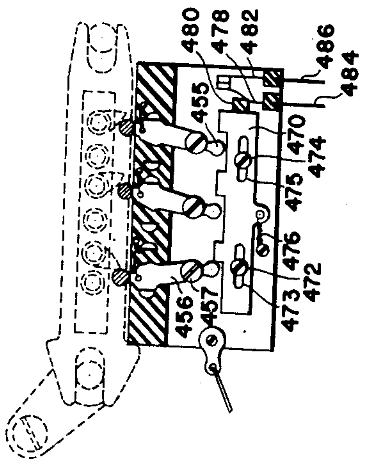
Figure 9 is a sectional view illustrating certain switching elements of a conventional electrical teletypewriter.
Figure 7:
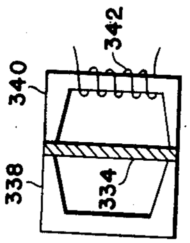
Figure 7 is a fragmentary sectional view illustrating the construction of a single head.

Figure 9 illustrates the fashion in which provision is made for closing the contact at F‴ to the line 215 previously described. Comparison with the disclosure of Patent 2,161,564 above mentioned will show that the rocking contacts 456 corresponding to those in the patent are provided below their pivots 457 with extensions 455 which are arranged to engage upwardly extending lugs on a slide 470 which is guided for horizontal movement by engagement of screws 472 and 474 within slots 473 and 475. A spring 476 urges the slide 470 toward the left. An insulated extension 480 at the right-hand end of the slide is arranged to close contacts 478 and 482 having the external connections 484 and 486. As will be evident, whenever any one of the rocking contacts 456 moves counterclockwise the switch contacts 478 and 482 will be closed. If, as usual, two banks of these switches are provided the two corresponding sets of contacts 478 and 482 will be connected in series to provide for a definite single closure of the series circuit. This circuit corresponds to the circuit between the contact involving F‴ and the bus F″ in Figure 2.

It will be clear from the foregoing that the circuits which have been described are not necessarily limited to recording on or reading from magnetic tape as the record element. As a most obvious variant of the invention there may be cited recording on and reading from photographic film in which case pick-up would involve photoelectric devices and recording would involve illumination of the film. It will be readily apparent to those skilled in the art how such substitutions may be made for the magnetic heads which have been described.

Furthermore, it will be evident that instead of a typewriter as the encoding and decoding device there may be used many other devices, including punched tapes or cards for inserting information into the system and printing or card or tape punch devices or the like for receiving the information from the system.

What we claim and desire to protect by Letters Patent is:

1. In combination, a plurality of magnetic recording heads, means for advancing a magnetic tape past said heads, said heads being related to said tape to record along parallel channels on said tape, set-up devices individual to said channels, means for delivering selectively to said set-up devices signals to set said devices in active state, means individually conditioned by a corresponding one of said devices in its active state, means for delivering signals of predetermined duration through conditioned ones of said last named means to corresponding recording heads to effect recording of magnetic pulses in corresponding channels on the tape, and means for clearing all of said set-up devices from said active state.

2. In combination, a plurality of magnetic recording heads, means for advancing a magnetic tape past said heads, said heads being related to said tape to record along parallel channels on said tape, set-up devices of flip-flop type individual to said channels, means for delivering selectively to said set-up devices signals to set said devices in active state, means individually conditioned by a corresponding one of said devices in its active state, means for delivering signals of predetermined duration through conditioned ones of said last named means to corresponding recording heads to effect recording of magnetic pulses in corresponding channels on the tape, and means for clearing all of said set-up devices from said active state.

3. In combination, a plurality of magnetic recording heads, means for advancing a magnetic tape past said heads, said heads being related to said tape to record along parallel channels on said tape, set-up devices individual to said channels, means for delivering selectively to set set-up devices signals to set said devices in active state, means individually conditioned by a corresponding one of said devices in its active state, means for delivering signals of predetermined duration through conditioned ones of said last named means to corresponding recording heads to effect recording of magnetic pulses in corresponding channels on the tape.

4. In combination, a plurality of magnetic recording heads, means for advancing a magnetic tape past said heads, said heads being related to said tape to record along parallel channels on said tape, set-up devices of flip-flop type individual to said channels, means for delivering selectively to said set-up devices signals to set said devices in active state, means individually conditioned by a corresponding one of said devices in its active state, means for delivering signals of predetermined duration through conditioned ones of said last named means to corresponding recording heads to effect recording of magnetic pulses in corresponding channels on the tape.

5. In combination, a plurality of magnetic recording heads, means for advancing a magnetic tape past said heads, said heads being related to said tape to record along parallel channels on said tape, set-up devices individual to said channels, means for delivering selectively to said set-up devices signals to set said devices in active condition, mean for delivering auxiliary control signals, means jointly responsive to the devices in said active condition and to said auxiliary control signals to deliver pulses to said recording heads to effect recording of magnetic pulses in corresponding channels on the tape, and means for clearing all of said set-up devices from said active condition.

6. In combination, a plurality of magnetic recording heads, means for advancing a magnetic tape past said heads, said heads being related to said tape to record along parallel channels on said tape, set-up devices individual to said channels, means for delivering selectively to said set-up devices signals to set said devices in active condition, means for delivering auxiliary control signals, and means jointly responsive to the devices in said active condition and to said auxiliary control signals to deliver pulses to said recording heads to effect recording of magnetic pulses in corresponding channels on the tape.

7. In combination, a plurality of magnetic recording heads, means for advancing a magnetic tape past said heads, said heads being related to said tape to record along parallel channels on said tape, set-up devices individual to said channels, means for delivering selectively to said set-up devices signals to set said devices in active condition, means for delivering auxiliary control signals, means jointly responsive to the devices in said predetermined condition and to said auxiliary control signals to deliver pulses of active duration to said recording heads to effect recording of magnetic pulses in corresponding channels on the tape, means for clearing all of said set-up devices from said active condition, and means energizing said heads to erase pulses from the tape except when said pulses are being recorded thereon.

8. In combination, a plurality of magnetic recording heads, means for advancing a magnetic tape past said heads, said heads being related to said tape to record along parallel channels on said tape, set-up devices individual to said channels, means for delivering selectively to said set-up devices signals to set said devices in active condition, means for delivering auxiliary control signals, means jointly responsive to the devices in said active condition and to said auxiliary control signals to deliver pulses to said recording heads to effect recording of magnetic pulses in corresponding channels on the tape, means for clearing all of said set-up devices from said active condition, and means energizing said heads to erase pulses from the tape except when said pulses are being recorded thereon.

9. In combination, a plurality of magnetic recording heads, means for advancing a magnetic tape past said heads, said heads being related to said tape to record along parallel channels on said tape, set-up devices individual to said channels, means for delivering selectively to said set-up devices signals to set said devices in active condition, means for delivering auxiliary control signals, means jointly responsive to the devices in said predetermined condition and to said auxiliary control signals to deliver pulses of active duration to said recording heads to effect recording of magnetic pulses in corresponding channels on the tape, and means energizing said heads to erase pulses from the tape except when said pulses are being recorded thereon.

10. In combination, a plurality of magnetic recording heads, means for advancing a magnetic tape past said heads, said heads being related to said tape to record along parallel channels on said tape, set-up devices individual to said channels, means for delivering selectively to said set-up devices signals to set said devices in active condition, means for delivering auxiliary control signals, means jointly responsive to the devices in said active condition and to said auxiliary control signals to deliver pulses to said recording heads to effect recording of magnetic pulses in corresponding channels on the tape, and means energizing said heads to erase pulses from the tape except when said pulses are being recorded thereon.

11. In combination, a plurality of recording devices, means for advancing a strip past said recording devices, said devices being related to said strip to record along parallel channels of said strip, set-up devices individual to said channels, means for delivering selectively to said set-up devices signals to set the set-up devices in active condition, means for delivering auxiliary control signals, means jointly responsive to the set-up devices in said active condition and to said auxiliary control signals to deliver pulses of predetermined duration to said recording devices to effect recording of pulses in corresponding channels on said strip, and means for clearing all of said set-up devices from said active condition.

12. In combination, a plurality of recording devices, means for advancing a strip past said recording devices, said devices being related to said strip to record along parallel channels of said strip, set-up devices of flip-flop type individual to said channels, means for delivering selectively to said set-up devices signals to set the set-up devices in active condition, means for delivering auxiliary control signals, means jointly responsive to the set-up devices in said predetermined condition and to said auxiliary control signals to deliver pulses of active duration to said recording devices to effect recording of pulses in corresponding channels of said strip, and means for clearing all of said set-up devices from said active condition.

13. In combination, a plurality of recording devices, means for advancing a strip past said recording devices, said devices being related to said strip to record along parallel channels of said strip, set-up devices individual to said channels, means for delivering selectively to said set-up devices signals to set the set-up devices in active condition, means for delivering auxiliary control signals, and means jointly responsive to the set-up devices in said active condition and to said auxiliary control signals to deliver pulses of predetermined duration to said recording devices to effect recording of pulses in corresponding channels of said strip.

14. In combination, a plurality of recording devices, means for advancing a strip past said recording devices, said devices being related to said strip to record along parallel channels of said strip, set-up devices of flip-flop type individual to said channels, means for delivering selectively to said set-up devices signals to set the set-up devices in active condition, means for delivering auxiliary control signals, and means jointly responsive to the set-up devices in said predetermined condition and to said auxiliary control signals to deliver pulses of active duration to said recording devices to effect recording of pulses in corresponding channels on said strip.

15. In combination, a plurality of recording devices, means for advancing a strip past said recording devices, said devices being related to said strip to record along parallel channels of said strip, set-up devices individual to said channels, means for delivering selectively to said set-up devices signals to set the set-up devices in active condition, means for delivering auxiliary control signals, means jointly responsive to the set-up devices in said active condition and to said auxiliary control signals to deliver pulses to said recording devices to effect recording of pulses in corresponding channels on said strip, and means for clearing all of said set-up devices from said active condition.

16. In combination, a plurality of recording devices, means for advancing a strip past said recording devices, said devices being related to said strip to record along parallel channels of said strip, set-up devices individual to said channels, means for delivering selectively to said set-up devices signals to set the set-up devices in active condition, means for delivering auxiliary control signals and means jointly responsive to the set-up devices in said active condition and to said auxiliary control signals to deliver pulses to said recording devices to effect recording of pulses in corresponding channels of said strip.

17. In combination, a set of registers each having an active and an inactive state, a first signal source selectively activating said registers, a set of signal gates each conditioned by a corresponding one of each registers in its active state, a set of load devices each respectively connecting with one of said signal gates, and a second signal source delivering signals through said conditioned signal gates to said associated load devices.

18. In combination, a set of registers each having an active and an inactive state, a first signal source selectively activating said registers, a set of signal gates each conditioned by a corresponding one of said registers in its active state, a set of recording devices each respectively connecting with one of said signal gates, a second signal source delivering an impulse of predetermined duration through said conditioned signal gates to their respective recording devices, and means returning each of said registers to its inactive state.

19. In combination, a set of registers each having an active and inactive state, a set of signal gates each conditioned by a corresponding one of said registers in its active state, a set of recording devices each respectively connecting with one of said signal gates, a signal responsive network delivering an impulse of predetermined duration through said conditioned signal gates to their respective recording devices, and a signal source selectively activating said registers, said signal source energizing said signal responsive network after activating said selected registers.

20. In combination, a set of registers each having an active and inactive state, a set of signal gates each conditioned by a corresponding one of said registers in its active state, a set of recording devices each respectively connecting with one of said signal gates, a signal responsive network delivering an impulse of predetermined duration through said conditioned signal gates to their respective recording devices, a signal source selectively activating said registers, said signal source energizing said signal responsive network after activating said selected registers, and means returning each of said registers to its inactive state a predetermined time after said signal responsive network is energized.

21. In combination, a set of flip-flop circuits each having setup and clearing input leads, and an output lead; a set of signal coincidence gates each having a first input lead respectively connecting with the output lead of one of said flip-flop circuits, a second input lead, and an output lead; a set of recording devices each respectively connecting with the output lead of one of said signal gates; a signal responsive network having a first output lead connecting with the second input leads of said signal gates, a second output lead connecting with the clearing input leads of said flip-flop circuits, and an input lead: and a signal source having a first set of output leads for selectively energizing the setup leads of said flip-flop circuits, and a second output lead for energizing the input lead of said signal responsive network after said first set of output leads have been selectively energized.

References Cited in the file of this patent

UNITED STATES PATENTS

| Number | Name | Date |
|---|---|---|
| 2,378,383 | Arndt, Jr. | June 19, 1945 |
| 2,378,388 | Begun | June 19, 1945 |
| 2,439,446 | Begun | Apr. 13, 1948 |
| 2,441,065 | Green | May 4, 1948 |
| 2,533,326 | Putt | Dec. 12, 1950 |
| 2,540,654 | Cohen | Feb. 6, 1951 |
| 2,549,071 | Dusek | Apr. 17, 1951 |

OTHER REFERENCES

Publication: "The Annals of the Computation Laboratory of Harvard University," vol. XVI, 1948; Title: "Proceeding of a Symposium On Large Scale Digital Calculating Machinery." Pages 267–273; Paper titled: "Transfer Between External and Internal Memory," by C. Bradford Sheppard.